May 1, 1951 — W. G. MARTIN — 2,551,216
SILO
Filed June 7, 1945 — 3 Sheets-Sheet 2

INVENTOR.
Wesley G. Martin
BY
Elvin A. Andrus
Attorney

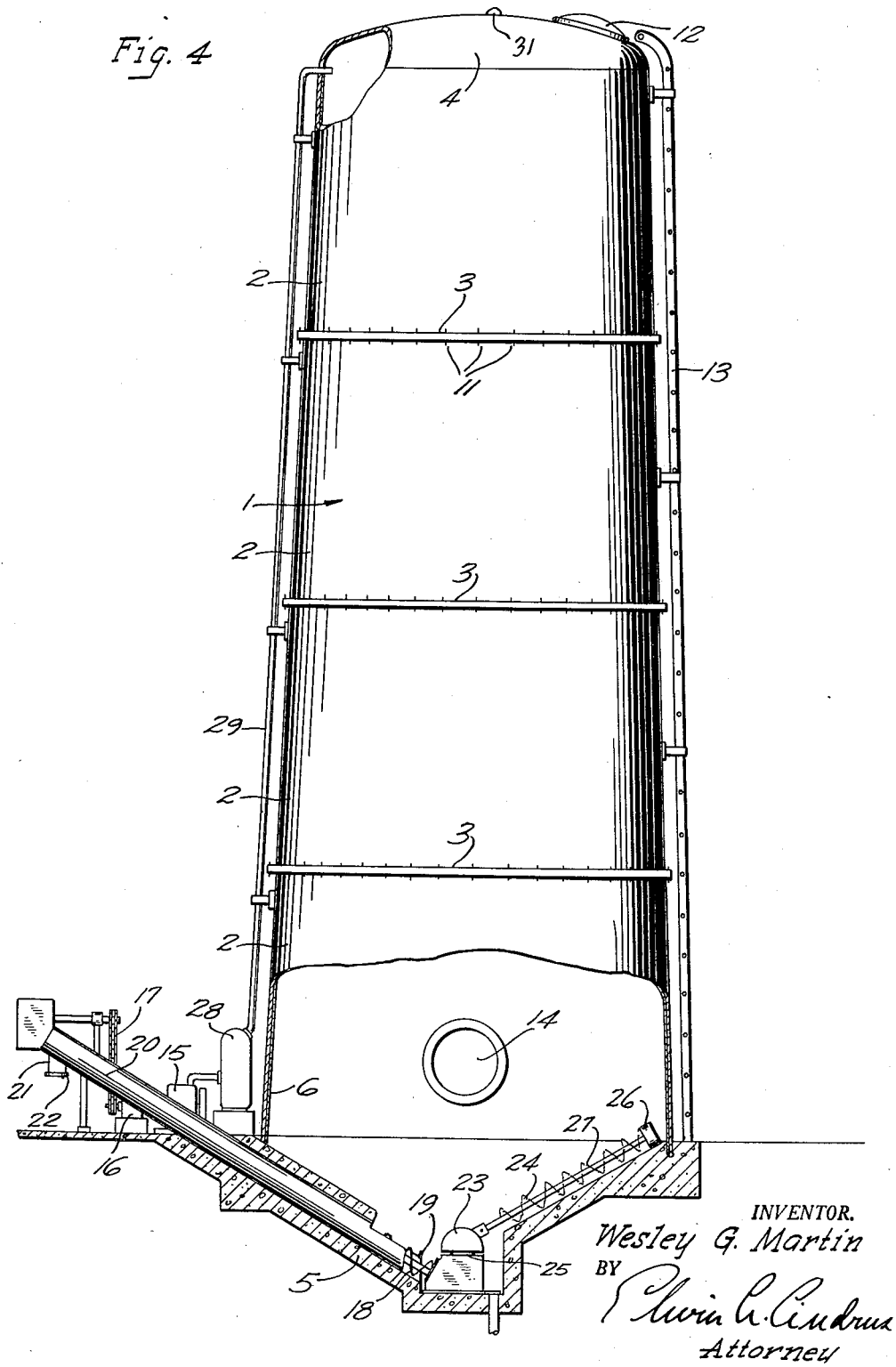

Patented May 1, 1951

2,551,216

UNITED STATES PATENT OFFICE 2,551,216

SILO

Wesley G. Martin, Milwaukee, Wis., assignor to A. O. Smith Corporation, Milwaukee, Wis., a corporation of New York Application June 7, 1945, Serial No. 598,044

7 Claims. (Cl. 99—235)

1

This invention relates to a silo and has particular reference to a silo that is substantially airtight and in which substantially oxygen free gas is provided in at least sufficient volume to equal the volume of silage removed from time to time.

During the feeding period from an ordinary silo, it is necessary to climb to the top of the height of the silage at regular intervals in order to fork out the feed. Silage exposed to air will mold. By removing the silage from the top at regular intervals, the silage is normally continually used faster than the mold can grow. The silage thus requires constant attention and often a large amount of the silage deteriorates and is wasted.

Removal of silage from the bottom of the ordinary silo would cause air to be admitted and to filter up through the silage. Mold would then grow in the silage mass and seriously deteriorate the silage for feeding purposes.

One object of the present invention is to provide a substantially airtight silo.

Another object is to provide a silo from which silage is removed from the bottom of the silo without any substantial entry of air.

A further object is to provide a silo in which any infiltrating air is purged and displaced to prevent attack of the silage by molds.

Another object is to provide a silo in which gases substantially devoid of free oxygen are supplied in sufficient volume to equal the volume of silage removed.

A further object is to provide a silo that eliminates any substantial wasting of the silage stored therein.

Another object is to provide a bottom unloading silo in which the downward movement of silage therein is not interrupted by freezing of the silage to the walls.

Another object is to reduce the weight of silage transmitted to the walls of the silo so that steel walls can be employed of a thinness that is practical within required limits of cost.

These and other objects of the invention will be clear from the following description of several embodiments of the invention as shown in the accompanying drawings.

In the drawings:

Fig. 4 is a schematic showing of another embodiment of the invention.

Figure 1:
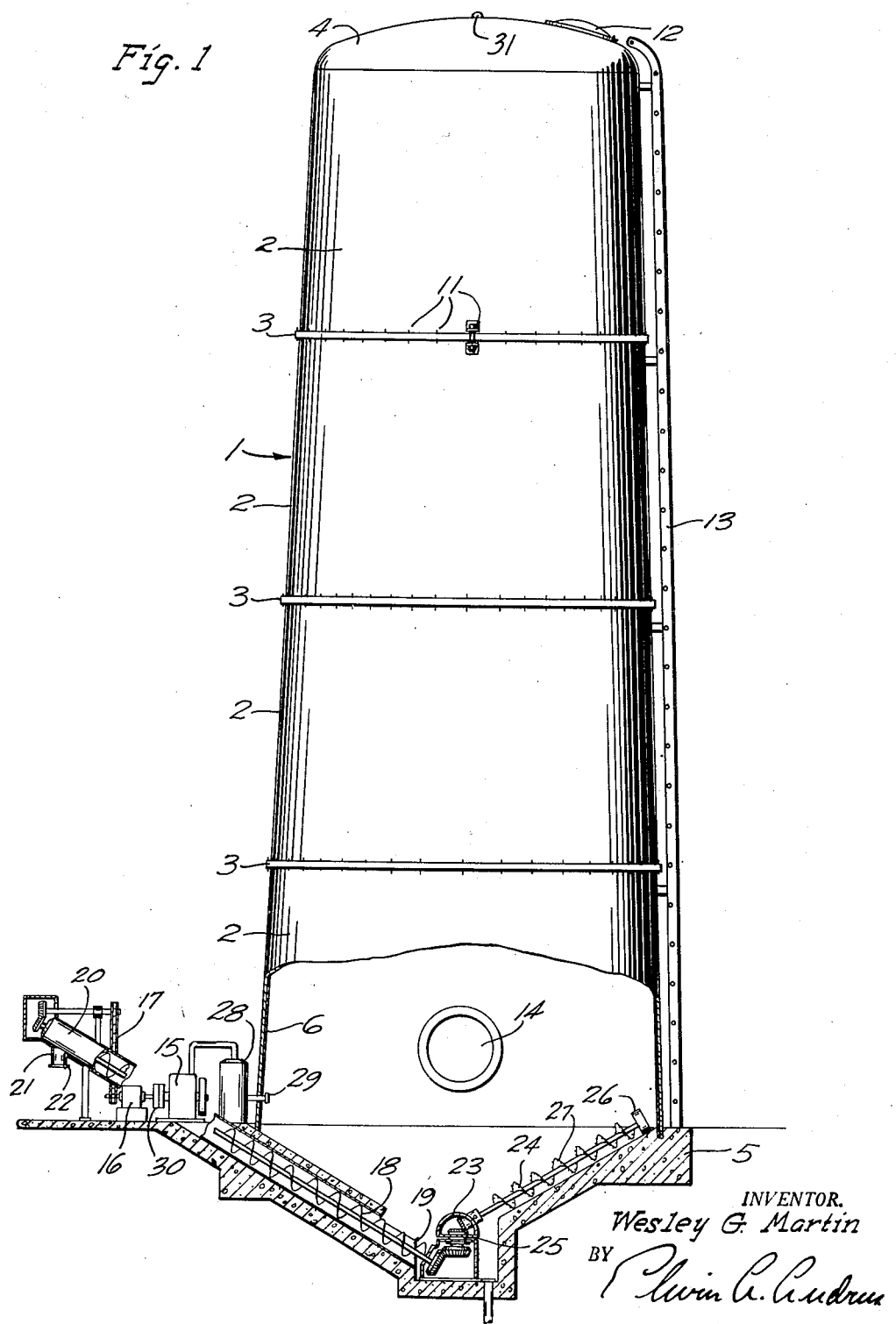
Figure 1 is a vertical elevation of a silo with parts broken away and sectioned, illustrating an embodiment of the invention.
Figures 2, 3:
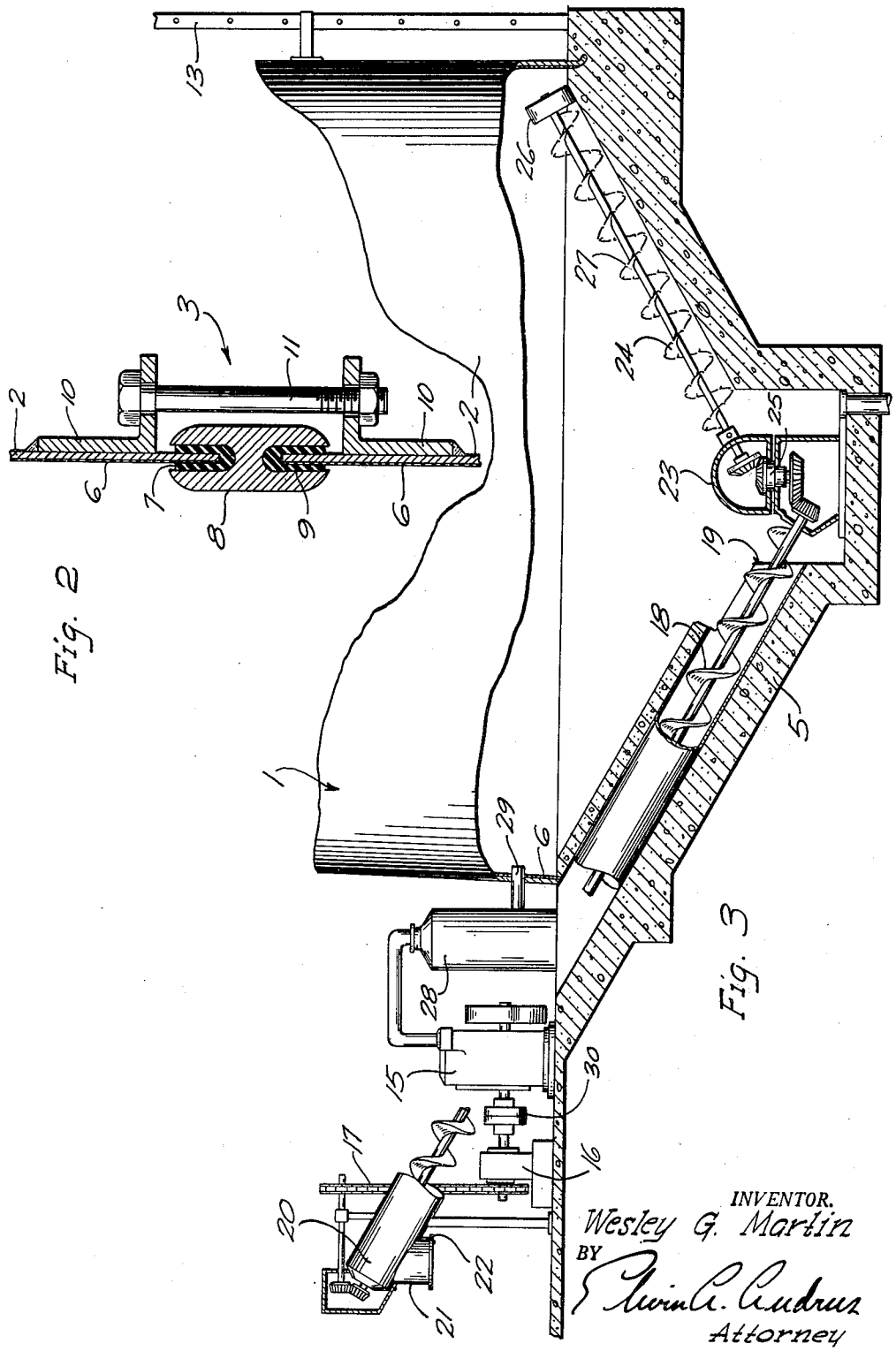
Fig. 2 is a detailed view of the joint construction between two sections of the shell.
Fig. 3 is an enlarged section showing the assembly to drive the mechanical feed for removing silage and to supply the silo with substantially oxygen free gas.

The term "silo" as employed herein refers to large storage structures of the general type employed on farms for the storage of chopped green corn for cattle feed. Such silos are exposed to various weather conditions and in many locations are subjected to freezing temperatures tending to cause freezing of the silage to the walls of the silo.

In one phase of the invention provision is made for utilizing the exhaust gases of the engine which drives the unloader for purging the silo of oxygen.

In another phase of the invention the silo is constructed of glass lined metal sheets whereby the tendency for the silage to stick to the walls by freezing is substantially eliminated and it is possible to successfully employ a bottom unloader.

The silo shown in the drawings illustrates one type of silo construction that may be employed and comprises a circular shell 1 of sheet metal constructed of a plurality of tubular sections 2 that are secured together at the circumferential joints 3 one on top of the other and which gradually decrease in diameter on a taper from the bottom to the top of the silo. The silo is closed at the top by the cover section 4 and is supported on the conically shaped foundation 5 of cement or the like which extends within the ground a substantial depth beneath the silo.

The several sections 2 and cover section 4 are pre-fabricated to circular shape and the proper dimensions from suitable metal at the factory and in fabrication are lined on the inside with corrosion resistant ceramic enamel 6 or other protective material to prevent corrosion of the metal in service. The pre-fabrication of the silo in sections enables the same to be readily shipped and assembled at the desired site.

In assembling the sections 2, the bottom section is first embedded in the foundation 5 and the next section is assembled on top of the bottom section and secured thereto at the joint 3. The silo is built up section by section in this manner until completed by securing the cover section 4 in place.

The joints between each section are the same and may be constructed in a number of different ways to insure that the silo will be substantially airtight. In the joints 3 shown, the ends of each section 2 to be joined together are disposed within the vertical grooves 7 of the annular ring 8. The packing material or gasket 9 of suitable compressible material is provided in each groove and surrounds the end portion of each section 2.

The joint is completed by a plurality of angle irons 10 which are welded to the sections adjacent each joint at a plurality of locations around the circumference of the silo. The circumferentially spaced bolts 11 extend through the flange of each angle iron 10 and when each bolt 11 is tightened the sections are tightly secured together and the gaskets 9 in each groove of ring 8 are compressed by the section ends to seal the joint against entry of air to the interior of the silo.

An opening 12 for filling the silo and access to the inside is located within the cover section 4 and access thereto is gained by the ladder 13 suitably secured to shell 1 and extending from the ground to the top of the silo. The opening 12 is closed by an air-tight cover when not in use.

The bottom section 2 may be provided with the door 14 for inspection or clean out purposes when the silo is empty. The door is constructed to seal the door opening against passage of air therethrough when the door is closed.

The mechanical apparatus for removing silage from the bottom of the silo may be of a number of different constructions but is of a nature to prevent entry of air to the silo when silage is being taken out. The removal apparatus is preferably combined with the apparatus for providing substantially oxygen free gas to the inside of the silo in sufficient volume to equal the volume of silage removed.

The apparatus for removing silage is driven by the internal combustion engine 15 through a speed reducer 16 and a chain drive 17 that is gear connected to the worm 18.

The worm 18 extends diagonally to the bottom of the silo through an opening 19 in the foundation 5 of substantially the diameter of the flights of the worm. The portion of worm 18 outside the silo is enclosed by the casing 20 and a short pipe 21 extends downwardly adjacent the outer end to provide an exit for the silage. The pipe 21 is closed by a spring pressed door 22 to prevent entry of air to the worm when the latter is not in operation.

The lower end of worm 18 is gear connected within a housing 23 to a second worm 24. The housing 23 is formed of two parts and is disposed in a manner to permit the upper portion to revolve around the bearing 25 as worm 18 rotates the worm 24.

The worm 18 drives the worm 24 around the bottom of the silo on conical foundation 5 and the outer end of worm 24 is provided with the wheel 26 to support the same and more readily enable revolution thereof. The flights of worm 24 are not enclosed so that the silage is cut up or loosened thereby as it comes in contact with the flights. In the event that the worm 24 is prevented by the silage from revolving on foundation 5, the worm rotates and cuts up the silage with which it comes into contact and draws the same downwardly toward the entrance to worm 18. The flights of worm 24 may be provided with teeth 27 to more readily bite into the silage.

The worm 18 when in operation conveys the silage outwardly from the bottom of the silo to discharge the same through the pipe 21.

Since the silage completely fills the worm passage substantially no air enters the silo when the worm is in operation and door 22 is open. When not in operation door 22 is closed and prevents entry of air to worm 18 and the inside of the silo.

The combustion engine 15 also provides the combustion gases that occupy the space in the silo previously filled by the removed silage or free space that may exist after the silo is filled.

The combustion gases are piped to the filter 28 from the exhaust of the engine and after passing through the filter they enter the silo through the pipe 29 extending into the silo through the bottom section. The filter 28 filters out the undesirable odors in the exhaust gases that might render the silage unpalatable for forage purposes.

A clutch 30 is provided adjacent engine 15 to control operation thereof so that the engine may be run to supply gas without driving the respective worms.

A safety valve 31 may be provided in the cover section 4 or shell of the silo to protect the structure in the event the pressure inside the silo differs from the external atmospheric pressure either positively or negatively.

In the second embodiment of the invention, illustrated in Fig. 4, after the combustion gases pass through the filter 28 they are piped to the inside of the silo by the pipe 29 which extends to the top of the silo to discharge the gases into the silo at the top.

In the first embodiment the gases enter the bottom of the silo and filter up through the silage to the top thereof which ordinarily will have an open space provided by lowering of the height of the silage upon removal of a portion thereof.

The gas is admitted to the silo in sufficient volume to at least equal the volume of the silage removed and is substantially devoid of free oxygen to eliminate deterioration of silage by oxygen. It may also be advisable to employ a separate unit for providing gas although ordinarily the engine 15 will be sufficient to supply the gas to the silo as well as to drive the apparatus to remove silage.

In the apparatus shown the clutch 30 permits operation of engine 15 to provide combustion gases for the inside of the silo without operation of the worms to remove silage. It may be desirable to force gas into the silo from time to time without removing silage therefrom to insure that the inside of the silo is constantly maintained oxygen free and that oxygen therein is purged by the combustion gases.

Various gases and mixtures of gases may be employed and may be fed to the silo from gas bottles if desired, the requirement being that the gas be as free as possible from constituents that promote deterioration of the silage.

The glass surface of the structure is impervious to the acids formed in the fermentation of crop material stored in the silo and tends to become wetted thereby so as to facilitate the downward movement of the stored mass as silage is removed at the bottom. Furthermore, by reason of this reduction in the friction, the metal shell of the silo may be constructed of thinner wall since substantially less load is transmitted thereto from the stored mass. In regions of frost it has been found that there is no freezing of the silage to the wall of the silo to interfere with the downward feeding of the silage mass.

The invention provides a silo in which silage can be removed from the bottom and in which gas is admitted to prevent deterioration of the silage stored therein. The term silage as used herein includes not only corn silage but all green farm crops that may be stored for later use such as hay, soybeans and the like. Also the word "silo" includes any storage structure in which green farm crops are stored to preserve them against injury by air.

Various embodiments of the invention may be employed within the scope of the accompanying claims.

I claim:

1. In combination, a silo-like storage structure for storing silage of substantially airtight construction, mechanical means therein for removal of silage therefrom in a manner to prevent any substantial entry of air to the silo, a gasoline engine to operate said removal means, and a connection between the engine and storage structure to supply engine exhaust gases substantially devoid of free oxygen to said structure to hold infiltration of air to a minimum and prevent deterioration of stored silage.

2. In a silo of substantially airtight construction, a generally large worm member extending into the bottom of said silo, a housing for the discharge end of said member to prevent entry of air into the silo, a smaller worm member gear connected to said larger worm member and disposed to rotate and to revolve around the bottom of said silo, an internal combustion engine disposed to rotate the larger worm to remove silage from the silo therewith and to rotate and revolve the smaller worm to loosen up the stored silage for ready removal, and a piping connection extending from the exhaust of said engine to the inside of the silo to pipe oxygen free exhaust gases to the inside of the silo in sufficient volume to replace the volume of silage removed.

3. In a silo of substantially airtight construction, a generally large worm member extending into the bottom of said silo, a housing for the discharge end of said member to prevent entry of air into the silo, a smaller worm member gear connected to said larger worm member and disposed to rotate and to revolve around the bottom of said silo, an internal combustion engine disposed to rotate the larger worm to remove silage from the silo therewith and rotate and revolve the smaller worm to loosen up the stored silage for ready removal, a piping connection extending from the exhaust of said engine to the inside of the silo to pipe oxygen free exhaust gases to the inside of the silo in sufficient volume to replace the volume of silage removed, and a filter member disposed in said piping connection to filter out undesirable odors from the exhaust gas that might render the silage unpalatable.

4. In a silo of substantially airtight construction, a generally large worm member extending into the bottom of said silo, a housing for the discharge end of said member to prevent entry of air into the silo, a smaller worm member gear connected to said larger worm member and disposed to rotate and to revolve around the bottom of said silo, an internal combustion engine disposed to rotate the larger worm to remove silage from the silo therewith and to rotate and revolve the smaller worm to loosen up the stored silage for ready removal, a piping connection extending from the exhaust of said engine to the inside of the silo to pipe oxygen free exhaust gases to the inside of the silo in sufficient volume to replace the volume of silage removed, and a clutch member provided in conjunction with the combustion engine to permit operation of the engine to drive exhaust gases into the silo without operating the worms for removing silage.

5. In combination, a silo of substantially airtight construction, a mechanical conveyor for removing material from said silo, a housing for the discharge portion of said conveyor outside of the silo and adapted to prevent entry of air therethrough, an internal combustion engine connected to drive said conveyor, and a pipe connection between said engine and silo for conducting exhaust gases of said engine into said silo.

6. A silo structure for the storage of crops in regions of varying weather conditions including freezing temperatures at times, comprising an upright substantially cylindrical thin metal wall closed at the top and supported upon a closed foundation at the bottom, a ceramic enamel lining for said metal wall providing a glass-like surface in contact with the stored crop material and which is impervious to any acid constituent of said material developed by fermentation and protects the metal therefrom, a normally closed and sealed inlet opening in the top of said structure for filling the same, a normally closed and sealed discharge opening at the bottom of said structure for the removal of material therefrom, and mechanical means disposed at the bottom of said structure for removing material through said last named opening, said glass-like surface of said wall facilitating the gradual downward movement of material in the structure as material is withdrawn by said removal means and reducing the load of the material transmitted to said wall.

7. A silo structure for the storage of crops in regions of varying weather conditions, comprising an upright substantially cylindrical container of glass-lined thin sheet metal sections secured together, a closure for the top of said container, a closure for the bottom of said container, a normally closed and sealed discharge opening at the bottom of said structure for removal of material therefrom, and mechanical means disposed at the bottom of said container for removing material through said opening, said glass lining reducing the load of the material transmitted to the walls of the structure and facilitating the downward movement of material as the latter is withdrawn at the bottom.

WESLEY G. MARTIN.

REFERENCES CITED

The following references are of record in the file of this patent:

UNITED STATES PATENTS

| Number | Name | Date |
| --- | --- | --- |
| 947,130 | Rogers | Jan. 18, 1910 |
| 1,275,558 | Holmgreen | Aug. 13, 1918 |
| 1,390,341 | Cushing | Sept. 13, 1921 |
| 1,641,340 | Mabee | Sept. 6, 1927 |
| 1,703,782 | Schmidt | Feb. 26, 1929 |
| 2,281,407 | Bohnsack | Apr. 28, 1942 |
| 2,305,423 | Heuser | Dec. 15, 1942 |
| 2,351,853 | Graham | June 20, 1944 |
| 2,386,052 | Lundy | Oct. 2, 1945 |

FOREIGN PATENTS

| Number | Country | Date |
| --- | --- | --- |
| 505,231 | Great Britain | May 8, 1939 |